Patented June 10, 1952

2,599,751

UNITED STATES PATENT OFFICE 2,599,751

WELDING PROCESS FOR JOINING A METAL BODY AND A SEMICONDUCTING BODY COMPOSED OF METALLIC AND CERAMIC MATERIAL

Hermann Federspiel, Terlano, Italy

No Drawing. Application May 19, 1949, Serial No. 94,268. In Italy April 26, 1948

7 Claims. (Cl. 219—10)

This invention relates to a welding process for joining a metal body and a semi-conducting body composed of metallic and ceramic material. More particularly, the invention relates to a welding process for welding a metal body to a semi-conducting body in which the metallic component is comparatively small relative to the ceramic component.

As will be apparent, semi-conducting bodies with a small metallic component have predominantly ceramic characteristics rather than metallic characteristics. Practical tests and analysis show that the welding of a semi-conducting body of this type to a metal body offers considerable difficulties, particularly when electric welding is employed, by reason of the low conductivity of the semi-conducting body.

A strong and reliable welding joint between a metal body and a semi-conducting body of the general type, above referred to, is required in industry in many fields of application, particularly in the field of electrical engineering to connect a resistor made of or comprising semi-conducting material to a metal connector. It will be evident that for such applications strong and intimate connection is required, both for physical and electrical reasons.

One of the preferred fields of application of the present invention is the welding of connectors to semi-conducting resistors of the capillary type, described in the co-pending application Ser. No. 772,194, filed September 4, 1947.

One of the objects of the invention is to provide a novel and improved process for welding together strongly and intimately a metal body and a semi-conducting body containing a minor portion of metallic material and a major portion of ceramic material.

Another more specific object of the invention is to provide a novel and improved welding process by which the metallic content of the portion of the semi-conductor adjacent to the welding area or spot proper is increased. By such increase of the metallic content in a portion of the semi-conducting body, the transition from the purely metallic material of the metal body to the material of the semi-conducting body having only a small metallic content becomes more gradual. In other words, a semi-conducting body treated according to the invention includes zones having the original composition, that is, a low metallic content, and zones having an increased metallic content, the latter zones or zone facing the metal body. As a result, a mechanically strong, highly conducting and temperature resistant welding joint between the metal body and the semi-conducting body can be obtained. According to the invention, the aforementioned objects and advantages and other objects and advantages which may be pointed out hereinafter are attained by joining the two bodies by a reduction welding process. The applied reduction welding process can either be carried out by electric welding, by means of an electric arc or by gas welding by means of a reducing flame.

In case of electric welding, it is advantageous to initiate the fusing or melting of the proper portion of the semi-conducting body by applying a welding voltage higher than conventionally used for welding purposes. It has further been found that particularly advantageous results can be obtained when the ceramic component of the semi-conducting body comprises an oxide of the type, the electric resistance of which decreases with increasing temperature. As electrode, a carbon electrode is preferably used.

The reduction effect, both for gas welding and electric welding, can be further improved by directing a current of a reducing gas against the welding area or welding spot during the welding operation.

In case of electric welding, it is often advantageous to preheat the welding area or spot.

By an example the process of fabrication should be described:

An electric resistor body, made of 20 weight per cent chrome-oxide, 60 weight per cent manganese-oxide and 20 weight per cent ceramic-plastic cement, sintered in lightly reducing atmosphere, and consisting of chrome-oxide, manganese-oxide, ceramic cement and 0.3 weight per cent metal will be provided on both ends with connection terminals of iron for the current-conduction.

The connection terminals and the ceramic body corresponding to the explanations of the invention claims, should be connected together by a welding process.

For the welding purpose, the terminals and a carbon electrode will be connected to a voltage source and an arc produced between terminal and ceramic material on one side and the carbon electrode on the other side, the arc melting parts of the metal-terminals and of the ceramic body.

The arc will be extinguished when the joint between ceramic body and the metal terminal is filled in with fluid material.

What is claimed is:

1. A welding process for joining a metal body and a semi-conductive body, the latter comprising in an intimate mixture a minor component of a metal and a major component composed of metal oxide and ceramic material, the said process comprising the steps of placing the portions of the two bodies at which the same are to be welded together in a close spacial relationship, and subjecting the said two portions to a welding temperature in the presence of a reducing atmosphere until metal oxide contained in the respective portion of the semi-conductive body is transformed into metal in its elemental form and until molten metal of the said portions forms a joint between the same.

2. In the welding process as defined in claim 1 the additional step of directing a stream of a reducing gas against the said portions to be welded together.

3. A welding process as defined in claim 1, wherein said major component of the semi-conductive body includes a metal oxide having a negative resistance coefficient.

4. A welding process for joining a metal conductor and a semi-conductive resistance element, the latter comprising in an intimate mixture a minor component of a metal and a major component composed of metal oxide and ceramic material, the said process comprising the steps of placing said conductor and said resistance element in an abutting position, and subjecting the abutting portions of the conductor and the resistance element to a welding temperature in the presence of a reducing atmosphere until metal contained in the respective portion of the resistance element is transformed into metal in its elemental form and until molten metal of the abutting portions of the conductor and the respective element forms a joint between the same.

5. A welding process as defined in claim 1, wherein said welding temperature is generated by an electric arc.

6. In a heating process as defined in claim 5, the additional step of preheating the abutting portions of the conductor and the resistance element.

7. A welding process as defined in claim 1, wherein the welding temperature is generated by a gas flame.

HERMANN FEDERSPIEL.

REFERENCES CITED

The following references are of record in the file of this patent:

UNITED STATES PATENTS

| Number | Name | Date |
|---|---|---|
| 873,328 | Price | Dec. 10, 1907 |
| 1,884,665 | Greiner | Oct. 25, 1932 |
| 2,167,431 | Bowie | July 25, 1939 |
| 2,184,847 | Pearson | Dec. 26, 1939 |
| 2,271,995 | Baroni | Feb. 3, 1942 |
| 2,431,474 | Gaudenzi | Nov. 25, 1947 |
| 2,496,346 | Haayman | Feb. 7, 1950 |

FOREIGN PATENTS

| Number | Country | Date |
|---|---|---|
| 595,007 | Great Britain | Nov. 25, 1947 |